US011489872B2

(12) United States Patent
Shukla et al.

(10) Patent No.: US 11,489,872 B2
(45) Date of Patent: Nov. 1, 2022

(54) IDENTITY-BASED SEGMENTATION OF APPLICATIONS AND CONTAINERS IN A DYNAMIC ENVIRONMENT

(71) Applicants: Jayant Shukla, Sierra Madre, CA (US); Chaitanya Pemmaraju, Fremont, CA (US); Vamsi Ambati, Fremont, CA (US)

(72) Inventors: Jayant Shukla, Sierra Madre, CA (US); Chaitanya Pemmaraju, Fremont, CA (US); Vamsi Ambati, Fremont, CA (US)

( * ) Notice: Subject to any disclaimer, the term of this patent is extended or adjusted under 35 U.S.C. 154(b) by 149 days.

(21) Appl. No.: 15/976,189

(22) Filed: May 10, 2018

(65) Prior Publication Data

US 2019/0349402 A1 Nov. 14, 2019

(51) Int. Cl.
*H04L 29/06* (2006.01)
*H04L 9/40* (2022.01)
*H04L 9/08* (2006.01)

(52) U.S. Cl.
CPC .......... *H04L 63/20* (2013.01); *H04L 9/0838* (2013.01); *H04L 63/0263* (2013.01); *H04L 63/0428* (2013.01); *H04L 63/08* (2013.01); *H04L 63/104* (2013.01)

(58) Field of Classification Search
CPC ... H04L 63/20; H04L 9/0838; H04L 63/0263; H04L 63/0428; H04L 63/08; H04L 63/104; H04L 63/0823
See application file for complete search history.

(56) References Cited

U.S. PATENT DOCUMENTS

| 6,097,729 A * | 8/2000 | Chao ............... H04L 29/12009 370/401 |
| 7,865,931 B1 * | 1/2011 | Stone ............... H04L 63/0263 726/1 |
| 2007/0118878 A1 * | 5/2007 | Sastry ............... G06F 21/33 726/3 |
| 2015/0124809 A1 * | 5/2015 | Edsall ............... H04L 41/0893 370/390 |
| 2016/0072781 A1 * | 3/2016 | Zhang ............... H04L 63/08 726/4 |
| 2018/0316676 A1 * | 11/2018 | Gilpin ............... H04L 9/0891 |
| 2019/0288986 A1 * | 9/2019 | Mayuzumi ............... H04L 63/20 |

\* cited by examiner

*Primary Examiner* — Harunur Rashid (57) ABSTRACT

In one aspect, a method for defining a group-based policy for access to computing resources by an application/container or a group of application/container, includes the step of with a credential server: specifying a computing resource; specifying a group name and a strong cryptographic identity associated with the group name. The method includes the step of specifying a policy for an application/container belonging to a specific group to access the set of resources belonging to another group. The method includes the step of with a handler process: reading a list of subnets for which authentication is to be enforced. The method includes the step of processing an initiate authentication request with an initiator of a new network connection or initiating a new authentication request with the initiator of the network connection. Upon successful authentication, extracting the group identity of the remote application, checking the group security policy for permitting access, and based on the rule permitting or denying access.

5 Claims, 8 Drawing Sheets

IDENTITY-BASED SEGMENTATION OF APPLICATIONS AND CONTAINERS IN A DYNAMIC ENVIRONMENT

BACKGROUND

1. Field

This invention relates generally to the field of identity management systems and relates more particularly to a cloud-based solution for identity management, authentication, policy management, and policy enforcement for applications and containers.

2. Related Art

Identity management and authentication (IMA) systems are used to enforce security policy to protect resources from unauthorized access. The identity management aspect of such systems mediates access to resources for users and computing devices based on their identity. The authentication aspect provides a mechanism for positively validating the identity of a user. An example of an IMA deployment scenario is permitting a user to access a computing device based on login credentials. Another example of an IMA deployment scenario is applying firewall rules to determine whether to allow network connections between computing devices based on their identities or Internet Protocol (IP) addresses.

Existing IMA solutions assign identity to entities that are persistent, such as persons or computing devices. Virtual machines can be handled as well, if they can be treated as physical machines, and their credentials managed similarly. Current solutions do not, however, provide a mechanism to establish and manage the identity for applications. Applications are ephemeral in nature, and do not possess many of the capabilities upon which IMA solutions rely to associate identity to a unique object. An instance of an application does not have a unique identity and most applications lack the ability to obtain and store credential, and so are unable to perform typical operations necessary to prove their identity to such systems.

The inability of traditional IMA tools to manage identification and authentication for applications poses a security challenge for the widespread use of containers, which look much like applications to such tools. Containers have certain characteristics similar to a physical or virtual machine and are capable of storing information that could be used for credentials. However, they also have similarities with applications as execution of a container too is ephemeral in nature and that makes their identity assignment task challenging. Despite growing popularity fueled by their usefulness in cloud computing, attempts to assign identity to containers have been relatively few. Unlike for users and computing devices, whose relative permanence suggests the notion of identity, the need to assign and manage identity for containers and the applications within them has not been well-appreciated. As they start replacing virtual machines however, containers become attractive targets for attackers, and the need for container IMA takes on increasing urgency.

While the use of IMA for containers has not been approached head on, there have been attempts to authenticate containers through secret management. This approach has been used to mediate container access to databases; in order to be permitted to access database information, the containerized process is asked to supply a secret that only authorized processes have been given. Such a technique side-steps the question of identity by focusing on the authentication credential only. Only coarse-grained access control is possible, since the secret is generally a shared resource not bound to a unique process. Accordingly, improvements to the application of IMA for containers are desired.

While the problem of IMA for containers has not been approached head on, there have been attempts to authenticate containers through secret management. This approach has been used to mediate container access to databases; in order to be permitted to access database information, the containerized process is asked to supply a secret that only authorized processes have been given. Such a technique side-steps the question of identity by focusing on the authentication credential only. Only coarse-grained access control is possible, since the secret is generally a shared resource not bound to a unique process.

A major challenge for IMA of containers is assuring the initial provisioning of the identity. Assured identity generally starts with a root of trust, and bootstraps its way up, distributing trust to additional generations of nodes through secure protocols. Identity provisioning is especially difficult when containers are not tied to specific physical or virtual machines and cannot be provisioned based on the pedigree of their host machine. Container orchestration software, Kubernetes would be an example, attempts to solves the problem of secure assignment of identity by associating identities through the orchestration mechanism, taking advantage of the trust chain that is established as a part of installation. This approach, however, solves one problem by creating another; now bootstrapping of identity has become tightly coupled with the choice of orchestration platform.

Other approaches have been proposed to solve the identity problem. Permissive action links (PAL) are protocols originally designed to prevent unauthorized or accidental detonation of nuclear weapons by requiring multiple independent credentials be presented to effect action. The security burden now is validation of the identity of the requestor, as when the request for secret decryption is received, the PAL agent responsible for decrypting the secret must have a method for authenticating the requestor.

Closely tied to the problem of identity management for containers are the problems of security policy management and enforcement. Security policies often link the privileges of entities to physical attributes such as IP address. In the dynamic world of containerization, however, the physical attributes associated with the targets of security policy may change, or be irrelevant. For example, a firewall rule based on the respective IP addresses of two entities may not be feasible if the addresses of those entities change frequently or cannot be associated with a security criterion. One solution for correctly enforcing security policies in a dynamic environment could be configuring specific rules at the time of assignment of the attributes used by the security policies. Another option would be, rather than the security policy specification's relying on attributes subject to change, for it to use instead the identity of the target entities and their group memberships, and to enforce the policy by associating physical attributes with groups or identities at runtime.

The first method is straightforward, but generally not possible, as it requires full control over the assignment of attributes related to security policies. VMware vSphere, for example, is able to dynamically adjust IP firewall rules for virtual machines on the fly, enabling consistent application of IP address-based firewall rules for a virtual machine regardless of the IP address assigned to the virtual machine. VMware vSphere can enforce this, however, only because it has control over IP address assignment. Because of this control, it knows when IP addresses change and can adjust IP address-based firewall rules accordingly. In the absence of control over assignment of the physical attributes linked to the security policy however, such an approach becomes impractical.

The second option, based on a notion of true identity, poses stiff challenges, as it requires a method for identity management and authentication, and for coupling that identity to security policy, but it has very important advantages. Such an approach would be general and portable, not relying on control over orchestration of resources tied to security policies.

SUMMARY OF THE INVENTION

In one aspect, a method for defining a group-based policy for access to computing resources by an application or a group of applications, includes the step of with a credential server: specifying a computing resource; specifying a group name and a strong cryptographic identity associated with the group name. The method includes the step of specifying a policy for an application belonging to a specific group to access the set of resources belonging to the group name. The method includes the step of with a handler process: reading a list of subnets for which authentication is to be enforced. The method includes the step of processing an initiate authentication request with an initiator of a new network connection or initiating a new authentication request with the initiator of the network connection. The method includes the step of upon successful authentication: extracting an identity of the initiator and a group of the initiator. The method includes the step of obtaining a group security rule. The method includes the step of translating the group security rule into an IP firewall rule based on an observed IP address; and enforcing the IP firewall rule.

BRIEF DESCRIPTION OF THE DRAWINGS

Various embodiments described herein are illustrated by way of example, and not by way of limitation, in the figures of the accompanying drawings, in which.

It will be recognized that some or all the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

Disclosed are a system, method, and article of manufacture of identity-based segmentation of applications and containers in a dynamic environment. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application Programming Interface (API) is a set of subroutine definitions, protocols, and tools for building application software. In general terms, it is a set of clearly defined methods of communication between various software components.

Containers are a means of isolating processes where virtualization takes place within the operating system (OS) rather than at the hardware. Containerization makes it easy to deploy and run applications in different environments without having to worry about the impact of the runtime environment on the functioning of the containerized application, and vice versa. Containerization offers the advantages of virtualization while avoiding the overhead of having to replicate an entire operating system for each target application. In contrast with virtual machines, containers can be configured and started in seconds or minutes.

Dynamic Linked Library (DLL) is an example implementation of the shared library concept in an operating system.

Entity is the company or the user who is securing their infrastructure. The entity ID is how the entity is uniquely identified.

Identity management and authentication (IMA) systems are used to enforce security policy to protect resources from unauthorized access. The identity management aspect of such systems mediates access to resources for users and computing devices based on their identity. The authentication aspect provides a mechanism for positively validating the identity of a user.

Permissive action links (PAL) are protocols originally designed to prevent unauthorized or accidental detonation of nuclear weapons by requiring multiple independent credentials be presented to effect action.

Pre-defined location can be a file, environment variable, argument provided to the application at start, etc.

Secure Sockets Layer (SSL) is a cryptographic protocol.

IPsec is a protocol for secure communication.

EXAMPLE EMBODIMENTS

In one embodiment, a method for security policy enforcement and IMA for applications/containers in a network is provided. A cloud-based identity management method (and system) are provided to manage strong cryptographic identity and digital certificates for containers/applications (or a group of applications/containers together). The cloud-based identity management system can provision resources securely in a distributed computing environment. Once established, identity information is used by handler processes to perform general provisioning functions. Rules lists provide finer-grained controls for individual resources. The handlers, container/application identity, and rules lists operate together to provide a simplified identity management system that can be implemented and maintained in a large distributed network.

In one implementation, a computer system is monitored and scanned for applications. A group of applications/containers is assigned a strong credential or cryptographic identity, or a digital certificate. The strong cryptographic identity of each application/container is associated with a security policy group. The assignment of an application to a security group is based on the classification of the application after a scan. Security policies for provisioning of resources are defined for security groups. The enforcement of security policies is performed either by the application/container or by a separate handler process. The handler process uses the strong cryptographic identity of the application/container to authenticate to other applications/containers. Authenticated identities and group-based security policies are used for enforcing provisioning of resources. An example of such a policy is a firewall rule that is based on security group identifiers instead of IP addresses. Upon successful authentication, the group firewall rule is translated into the equivalent IP firewall rule and enforced. Accordingly, identity is associated with a group and the group is associated with a security policy. Authentication can then be resolved via identity. Identity can lead to group discovery. Group discovery can lead to policy discovery, and the application can enforce that policy.

In another implementation, a bootstrapping method is used to securely assign a strong cryptographic identity or a digital certificate to an application/container and associate that identity to a group. The assignment of an application to a security group is based on the classification of the application based on a scan of applications/containers executing on the computer system. A cloud-based credential manager generates an authentication token. The authentication token is provided to an orchestration server over a secure channel. The orchestration server transmits authentication token to the handler process over a secure channel. The handler process uses the authentication token to obtain strong cryptographic identity for the application/container. The strong cryptographic identity for the application/container is assigned a security policy group based on a group identifier. The group identifier is submitted by the handler process when requesting a credential for the application/container. The strong cryptographic identity may also be assigned a group based on the group that was associated with the authentication token. In this way, a bootstrapping process to issue a digital certificate to the container/application. It also covers association of the auth token to security group.

In another example embodiment, the identity of a set of applications/containers is managed remotely in the cloud-computing environment by a credential manager. It is noted that availability of the cloud-based credential manager can obviate the need for container-creating entities to set up their own local credential manager. A new entity registers with the credential manager, which assigns it an identity, along with a root certificate. The start of each new application/container is monitored at the network of the entity by a handler process at each computing device. The new application is scanned and assigned to a security group based on the classification of the application. Strong cryptographic identity is assigned to a new application/container by the cloud-based credential manager. Security policies are enforced for the application/container. Events are recorded.

In another implementation, a strong cryptographic identity of a set of applications/containers is managed by a credential manager in the cloud-computing environment. Tokens for issuing strong cryptographic identity are generated in the cloud-computing environment by the cloud service and associated with specific entity ID and security policy groups for that entity. An application programming interface (API) enables an application/container to use tokens and obtain a strong cryptographic identity from the cloud service. An authentication method ensures that tokens cannot be obtained by unauthorized users. Application orchestrator or application orchestration server will be tasked with obtaining the tokens, but the task can also be accomplished by the handler service. Based on that identity and group association, the credential manager also issues the application/container a security policy. The application/container uses its strong cryptographic identity to obtain access to a computing resource based on the issued security policy. The security policies cover, but are not limited to, resource accesses and permitted actions for the container/application. Some examples of resources and associated actions include: data contained in databases, access to file systems, and changing data in a file system or database, etc. Other examples of actions include initiating network connections and accessing remote applications/containers. In this way, server-side component of managing identity in the cloud-computing environment is provided.

In another example implementation, a security policy is defined for a group of applications and for controlling the interactions between the application groups. It is noted that a group of applications can be represented by a physical or virtual machine in some embodiments. An application/container from one group wishing to access resources of another application/container from another group is required to authenticate itself based on strong cryptographic credentials. This can be achieved by monitoring network connections. Upon detecting a new network connection, a mutual authentication mechanism is initiated. Upon successful mutual authentication, to decide whether to grant access, the target application/container determines the groups associated with the identity of the requesting application/container and obtains the corresponding security policies. A security policy may be further translated into physical attributes, (e.g. IP address). The security policy is enforced by the application/container, or the handler process, or a firewall. An alternative enforcement is to, upon successful authentication, associate IP addresses to their respective groups. To permit a network connection, group membership of the source and destination IP addresses are checked, then group security policy is checked before permitting access. In this way, a group-based security policy after identity resolution can be enforced.

Additionally, example embodiments provide the ability to dynamically assign strong cryptographic identity to an application/container (or a group of applications/containers together), associate that cryptographic identity with a logical security policy group, maintain and manage identity and group-based security policies for applications/containers in a cloud-computing platform. These security policies can then be enforced at the client where the application/container executes. Example embodiments overcome various limitations of traditional IMA solutions to enable identity management for ephemeral applications/containers. Security policies are enforced without the need to rely on static assignment of IP addresses.

Example Systems

Figure 1:
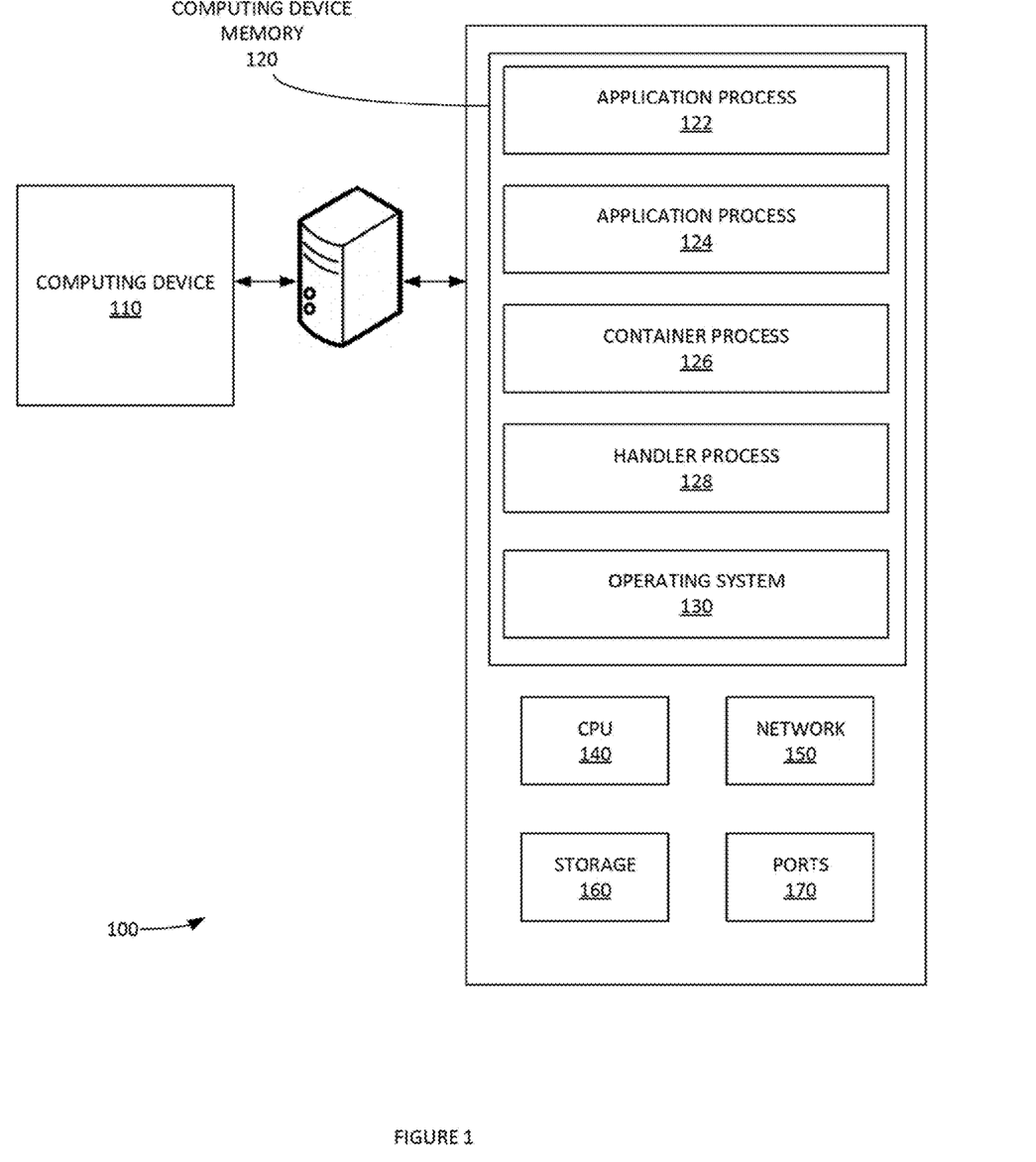
FIG. 1 illustrates a computer system for identity management of application/container group, according to some example embodiments.

For the embodiment illustrated in FIG. 1, the system 100 includes a computing device 110 that executes one or more applications 122 124 and containers 126. In the memory 120 of the client 110 a handler process 128 can be executed. Handler process 128 can manage the identities of the applications/containers. The handler process can be an independent process or part of the application/container whose identity it manages. The handler process 128 can be implemented as an application, kernel module, hypervisor, or a dynamic linked library (DLL). The handler process 128 monitors a plurality of application processes/containers 122-126 executing in the memory 120 of the client; provisions identity to the target application/container 122-126 using a cloud-based identity management service; effects authentication with other applications/containers that interact with said application/container 122-126; and enforces security policies based on the group association of the respective application/container 122-126.

The computing system 110 may include additional components including, but not limited to, central processing units (CPU) 140, storage devices 160, network devices 150, and input/output ports 170. While the computing system illustrated here has been illustrated with single CPU, storage device, network device, and input/output port, other example embodiments can be implemented in various different configurations of the computing system and incorporate more than one of these individual components. The computer system may further include compact disc read-only memory (CD-ROM), random access memory (RAM), erasable programmable read-only memory (EPROM), read-only memory (ROM), storage area network (SAN), or other storage medium that can be accessed by the computing system 110.

Figure 2:
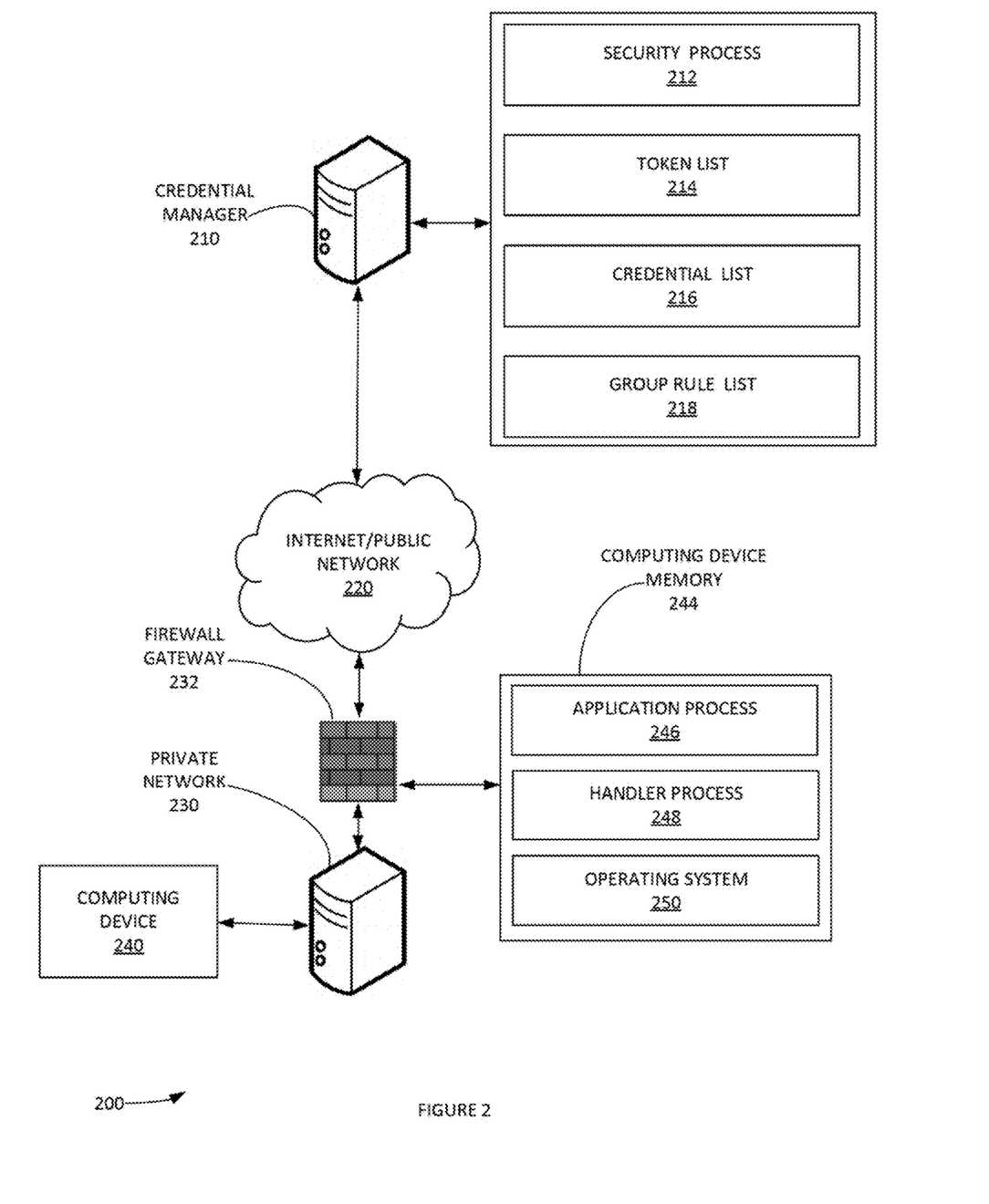
FIG. 2 illustrates a networked computer system for cloud-based identity management of application/container, according to some example embodiments.

FIG. 2 illustrates a block diagram of a computer network system 200 that represents one or more example embodiments. One or more networked computing devices 240 or computers execute applications 246 and are connected to other computer(s) through a network 230. The network 230 between the client computer and the credential manager 210 may include one or more components such as routers, switches, firewalls, content filters, proxies and other hardware that route the data transmitted between the client computers. The network between the client computer and client computers and credential manager 210, can be a public 220 or a private 230 network or a combination thereof. The client computers 240 are computing devices such as a personal computer, notebook computer, workstation, server, smart phone, or the like. The application 246 can be a webserver, database server, or any other application. A handler process 248 executes in the memory of the computing device and performs all tasks related to identity management and group security-policy enforcement. The credential manager 210 executes a security process 212 to manage requests for strong cryptographic identity and group-based security policies. The authentication token list 214, issued credential list 216, and group rule list 218 are stored by the credential manager. While the computer network system 200 depicts only one computing device, one credential manager, one application/container, and one handler process, the embodiments of the computer network system may contain multiple instances of each.

Example Processes

In one example embodiment, a strong cryptographic identity or digital certificate is assigned to an application/container and uses authentication of the identity, in conjunction with a group-based security policy, to provision computing resources and prevent unauthorized access. A mechanism for enforcing group-based security policy for access to computing resources is provided. A description and embodiment are also provided for a cloud-based identity management system that prevents unauthorized access to the resource of the application/container. In this way, identity is linked to group-based policy.

In one embodiment, the start of an application/container on a computer system is monitored. Policy requiring assignment of identity to application/container is checked. A token, identifier, group name, entity ID, and certificate authority location are assigned to the application/container; a handler process uses the token, identifier, group name, and entity ID to obtain a digital certificate from a cloud-based certificate authority; group security policy is specified for the entity ID; the handler process downloads a group security policy from the cloud; the handler process monitors all network connections; the handler process initiates an authentication mechanism for all new network connections; upon authentication, the handler obtains the group information of the remote process/container. In the above, the identifier is a unique identity given to the application/container and will be different for each instance of the application.

In one embodiment of the invention, a security policy is defined for a group. An application/container is assigned a group and the group identity becomes part of the strong cryptographic identity issued to the application/container. At runtime, the identity of the remote application/container is verified. As part of the verification process, the strong cryptographic identity of the remote application/container is obtained. The group association of the remote application/container is obtained from the strong cryptographic identity. The group security policy is looked up. Based on attributes of the application/container logical specifications are translated into physical specifications where appropriate. The updated security policy is enforced. In this way, strong cryptographic identity is linked to a group. This can be the basis for group-based policy.

In one embodiment of the invention, a cloud-hosted service provides credential management. The credential manager includes a native certificate authority with the ability to manage and assign certificates for applications/containers. The certificate authority assigns a unique identifier to and manages root certificates for each container-creating entity. The certificate authority manages tokens for each root certificate. The cloud-based service also manages group security policies for each entity. To use the service, the client sends a certificate signing request (CSR) along with a token to the cloud. The credential manager verifies the token and the customer ID and upon verification signs the certificate. The signed certificate for the application/container is sent back to the handler process. Accordingly, a cloud-based certificate management for application/container can be implemented.

Before a strong cryptographic identity or a digital certificate can be issued to an application/container, the means to uniquely identify an entity, root certificate, security groups, security policies, and tokens for obtaining strong cryptographic identity can be set up. The FIG. 3 illustrates an example method that can be used to clarify this process.

Figure 3:
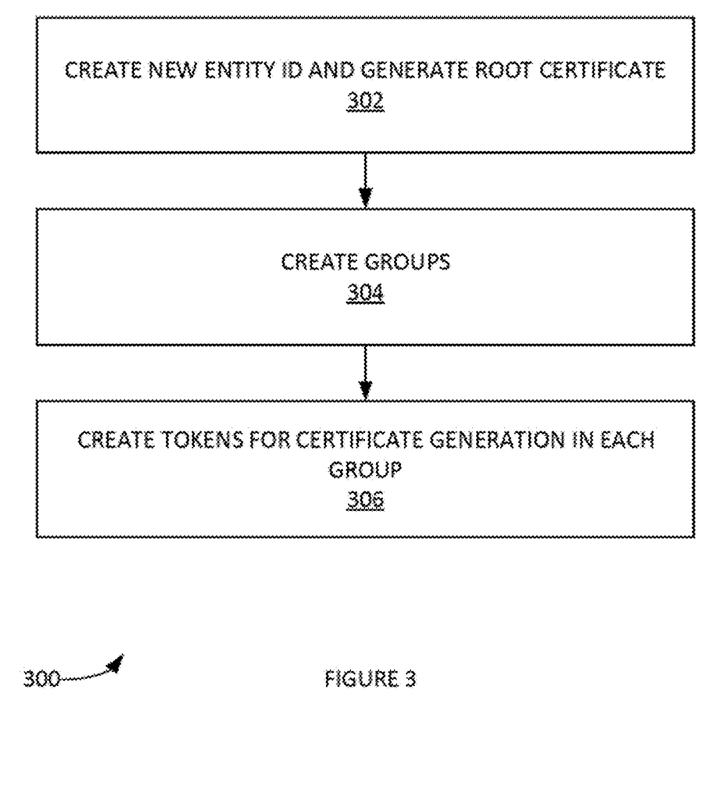
FIG. 3 is a generalized diagram illustrating the process for new entity creation. Groups are created. Tokens are created for each group.

FIG. 3 illustrates an example of the process 300 performed by the credential manager to create a new entity, according to some embodiments. The credential manager, upon receiving a request to create a new entity, first generates an identity and creates a root certificate 304. A unique entity ID is created and associated with the new entity. The generated root certificate is used to sign the certificate signing request from the application/container. As part of new entity creation, the credential manager also creates security policy groups 306 and generates single-use tokens 308 to be presented with certificate signing requests by the application/container. In one embodiment, the association of the tokens to specific security groups can be performed at the time of the creation of the groups. Alternatively, to make management simpler, the token/group assignment can be made by the certificate requestor. The tokens and their group associations are downloaded by the new entity, which can then distribute those tokens to a handler process for obtaining certificates from the certificate authority.

Figure 4:
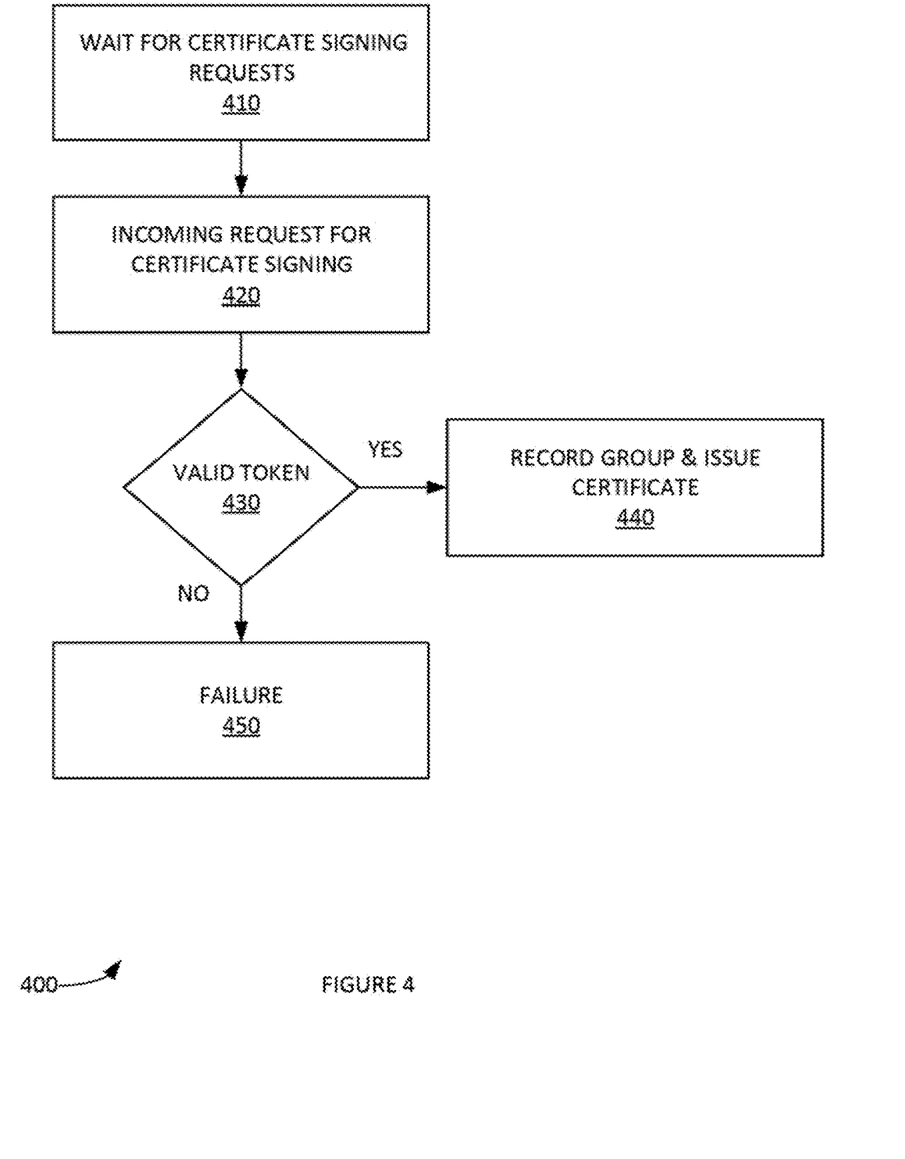
FIG. 4 illustrates a control flow chart at the credential manager for issuing certificates, according to some example embodiments.

FIG. 4 illustrates an example process 400 performed by the cloud-based credential manager (which also acts as a certificate authority) to manage tokens used for issuing strong cryptographic certificates to applications/containers, according to some embodiments. The cloud-based credential manager generates tokens and assigns the generated tokens to already-established entity IDs and their security groups. The cloud-based credential manager is publicly accessible and listens on a known port(s) for incoming requests for certificate signing 410. Upon receiving a new request for certificate signing 420, the credential manager initiates a validation mechanism. For each incoming request, the credential manager extracts the entity ID and the token from the request. The group name is extracted from the certificate to be signed. The token and its group are validated for the given token and entity ID. Upon validation 430, the certificate authority signs the certificate and returns the signed certificate to the handler process at the client 440. The spent token is invalidated so it cannot be used again. Tokens are also invalidated if they have not been used for a specified amount of time.

As mentioned in the discussion of FIG. 3 supra, association of groups with tokens can occur in two different ways. Depending on how the association was done, the group information about the certificate will be obtained accordingly. If groups are assigned to tokens as part of the identity-creation process, then the group information will be obtained from the tokens. If the client implemented the assignment, then the client can send the group information as part of the certificate signing request. If the client is able to specify the group, then there exists the possibility that a malicious user might attempt to alter group identity to bypass security restrictions. However, the advantage of letting the client specify the group is greatly improved ease of use. When the client sends the group name, the credential manager logs its association with that entity ID.

Figure 5:
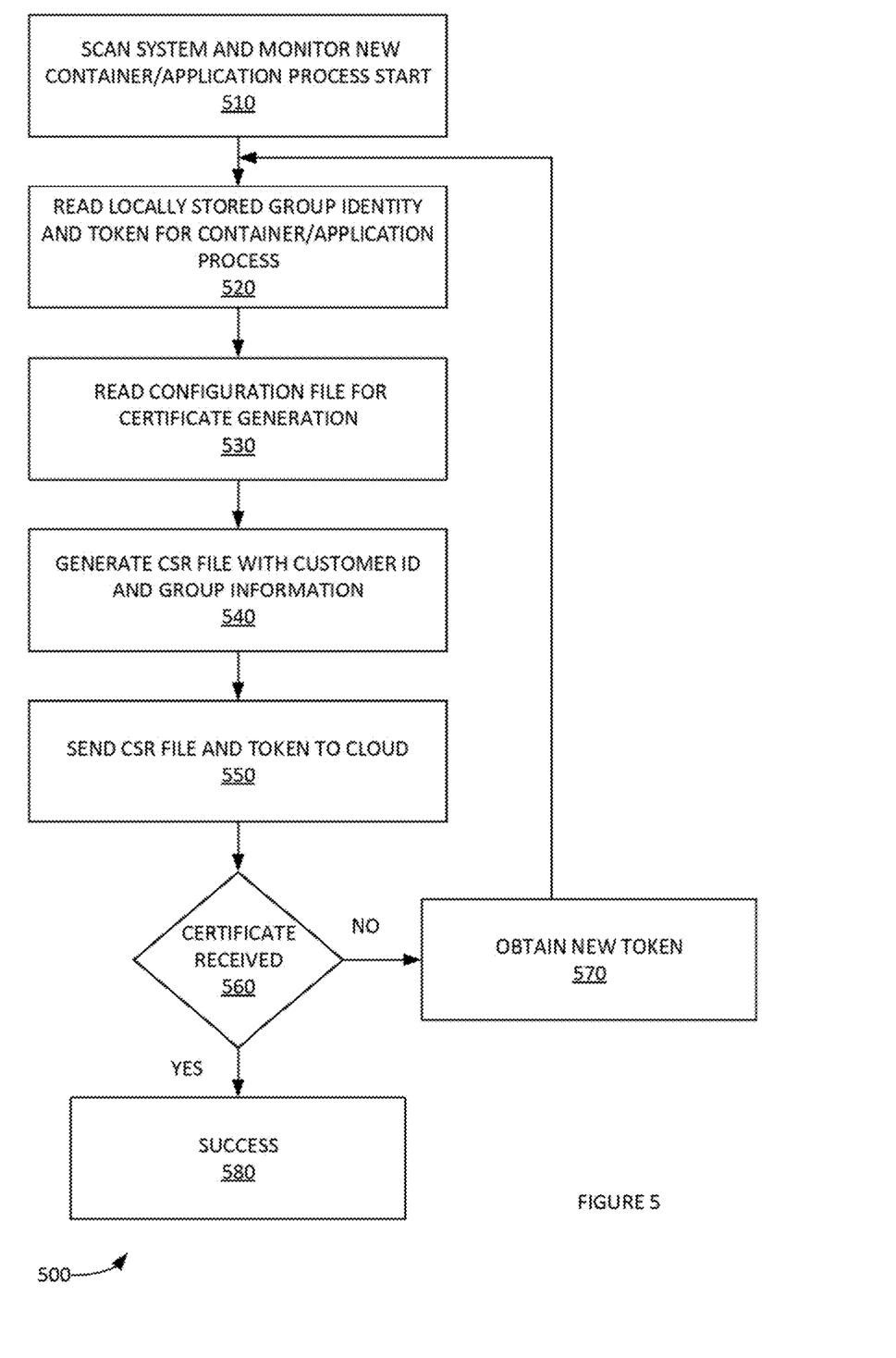
FIG. 5 illustrates a control flow chart for steps taken by the handler process to obtain a digital certificate, according to some example embodiments.

FIG. 5 illustrates an example process 500 for obtaining a digital certificate for an application/container at the computing device, according to some embodiments. The steps for obtaining the certificate can be performed by the application/container or by a separate handler process. The handler monitors the start of a new application/container 510. Upon detecting the start of an application/container, the handler determines the stored group identity of the application/container and other attributes 520. The security group identity may be stored in a file or as an environment variable. The handler may, additionally, read a certificate signing request generation configuration file 530. Configuration information includes, but is not limited to, entity ID, organizational unit, name of application/process, organization name, and group name. The handler generates a certificate signing request with the entity ID and security group name inserted into the certificate signing request 540. The handler process submits a certificate signing request to the credential manager along with the authentication token 550.

As described in FIG. 5, the credential manager receives the certificate sign requests, validates the token along with the entity ID, signs the digital certificate if the validation is successful, and sends the signed digital certificate to the handler process at the computing device. The handler process checks for a valid signed certificate from the credential manager 560. If a valid digital certificate is received, then the handler process uses the obtained certificate for authenticating the application/container to other applications/containers. In the event the handler process fails to receive a digital certificate, then t has two options. The first option is to retry with the existing token. The second option is to obtain a new token 570 and try again.

Example processes can issue strong cryptographic identity or digital certificate to each instance of an application/container via a cloud-based credential manager that uses a secure bootstrap mechanism to ensure that no unauthorized digital certificates can be obtained. Further, each cryptographic identity is associated with a security group.

Since group information is included in the strong cryptographic identity, that information can be relayed to the handler process that generates the request for certificate signing. The group identity can be incorporated into the token or it can be supplied to the handler process via an out-of-band mechanism. An example of such an out-of-band mechanism is using an environment variable. The environment variable can however be configured, and that process is prone to error. A better option is to generate the entire certificate in the cloud, though it will require that the identity of the application/container be conveyed to the certificate authority. A second handler process authenticates itself to the certificate authority to download tokens. The second handler is a trusted process that initiates the orchestration of the application/container. The second handler process provides the one-time-use token and group association for the application/container. The second handler process reads the group association, token, and customer identifier and generates a request for obtaining strong cryptographic identity or digital certificate for the application/container.

Figure 6:
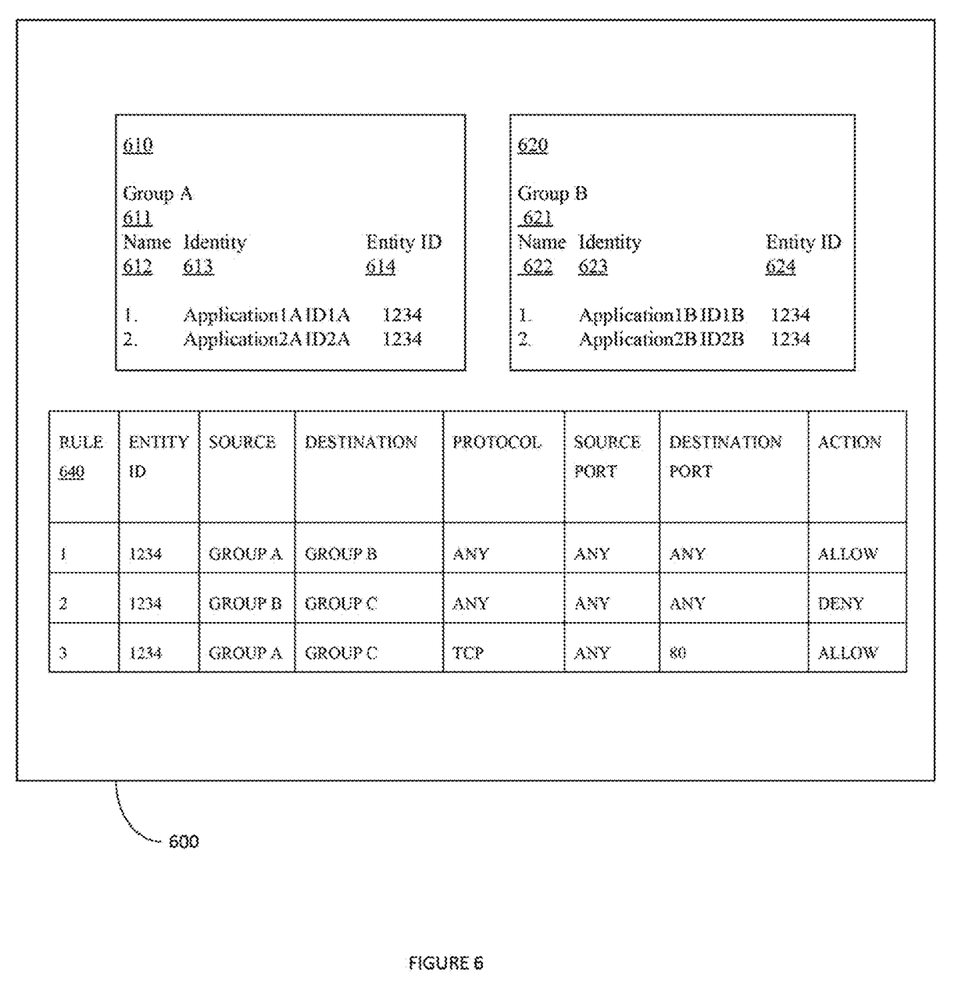
FIG. 6 is a generalized diagram illustrating a group-based policy specification that is tied to strong cryptographic identity.

FIG. 6 illustrates the specification 600 of groups whose members have strong cryptographic credentials and the specification of group-based firewall policies, according to some embodiments. Each group is given a group name 611 621 and a list of its members is maintained. For each member, a name 612 622 and its identity 613 623 along with a reference to its strong cryptographic credentials are stored. The firewall policies are defined based on group identifiers. Instead of the source and destination being specified as IP addresses, they are specified as group names. The group-based firewall policy is a five (5)-tuple 640 that includes source group, destination group, protocol, source port, and destination port. The entity ID can also be made part of the rule tuple. In an IP-based firewall rule, the source and destination fields are the IP addresses of the source and destination of the network connection.

Policies are prescribed for authentication based on subnet address scheme. The handler process is provided with a list of IP addresses and subnets that require authentication and ones that do not. The handler process monitors all network communications. The group policies are distributed to the handler process.

Figure 7:
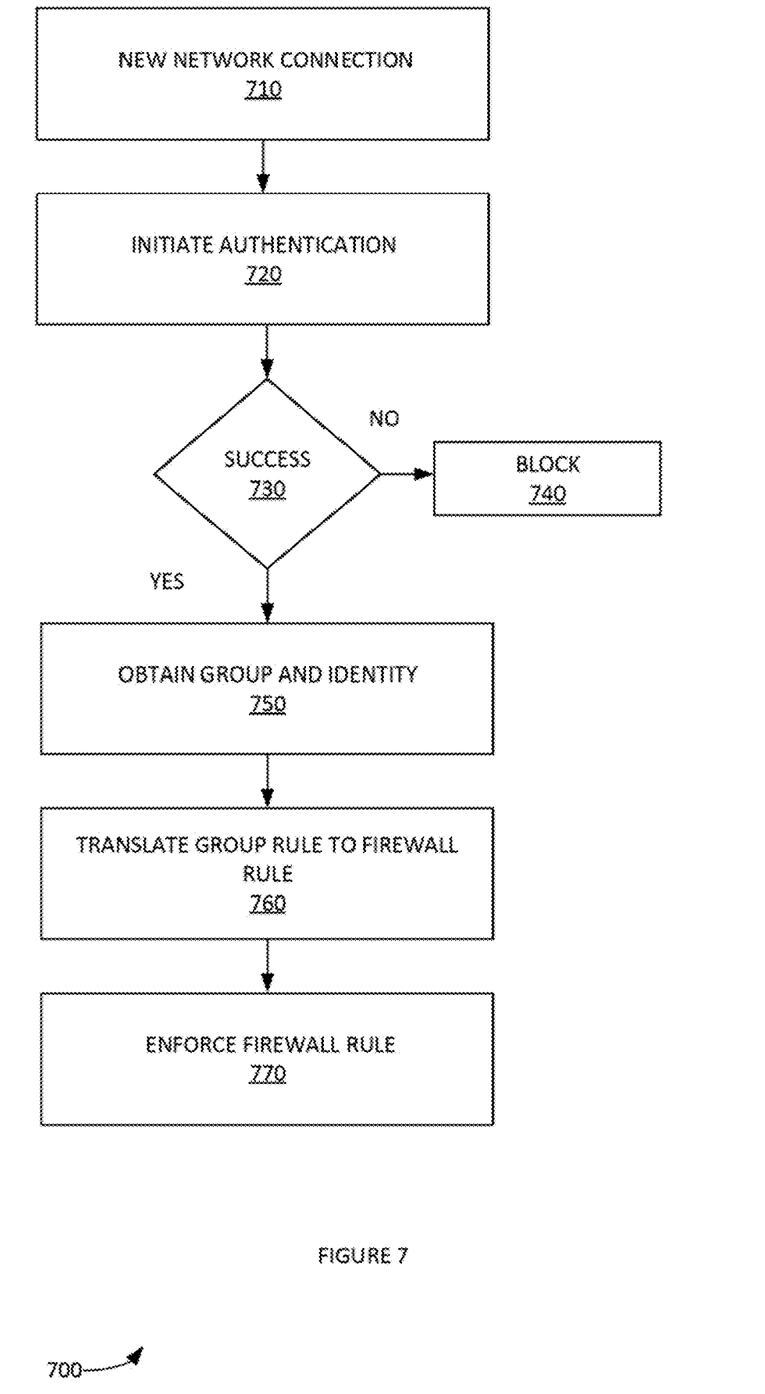
FIG. 7 illustrates a flow chart for enforcing a group-based policy for firewall rule enforcement for network connections between two application/container groups.

FIG. 7 illustrates an example process 700 performed to translate group security rules to locally-enforceable rules for the application/container. The handler process downloads security group rules (e.g. group rule list 218, group rules 840, etc.) for the application/container from the cloud-computing environment or credential server. Alternatively, the group security rules could be pushed to the handler process. The security policy provided to the handler process may be filtered based on the group identity information provided. Upon detecting an attempt to establish a local or network connection that could lead to access to a resource 710, the handler process initiates the authentication mechanism 720. Before the authentication mechanism is initiated, the handler process crosschecks the authentication policy to determine if authentication should be performed for that network connection. The handler process initiates the authentication mechanism based on the range of IP addresses or subnets where authentication can be performed before access to any computing resource should be permitted. The challenge response protocol can be specified by the user. The only requirement for the challenge response protocol is that it be based on a strong cryptographic identity that is associated with a security group.

Upon the successful completion of authentication, the handler process extracts the identity and group association of the remote party 750. The network connection is blocked if the authentication fails 740. If the authentication is successful, the group policy governing the communication with the discovered group is located and translated to its corresponding IP address 750. The IP-based security policy is pushed by the handler process to the firewall policy enforcer process 770. As an optimization, multiple policies may be merged into a larger subnet for efficient implementation. The updated firewall policy is applied. If the authentication fails, the handler process may add a rule to not initiate a new authentication session with that IP address for a certain duration. This option ensures that the handler process does not waste too many resources.

Alternatively, the handler process can enforce the security policies by maintaining association between groups and IP addresses upon successful authentication. Then for any network connection, groups corresponding to the source and destination IP addresses are obtained and the security policy specified for communication between those two groups is enforced.

Figure 8:
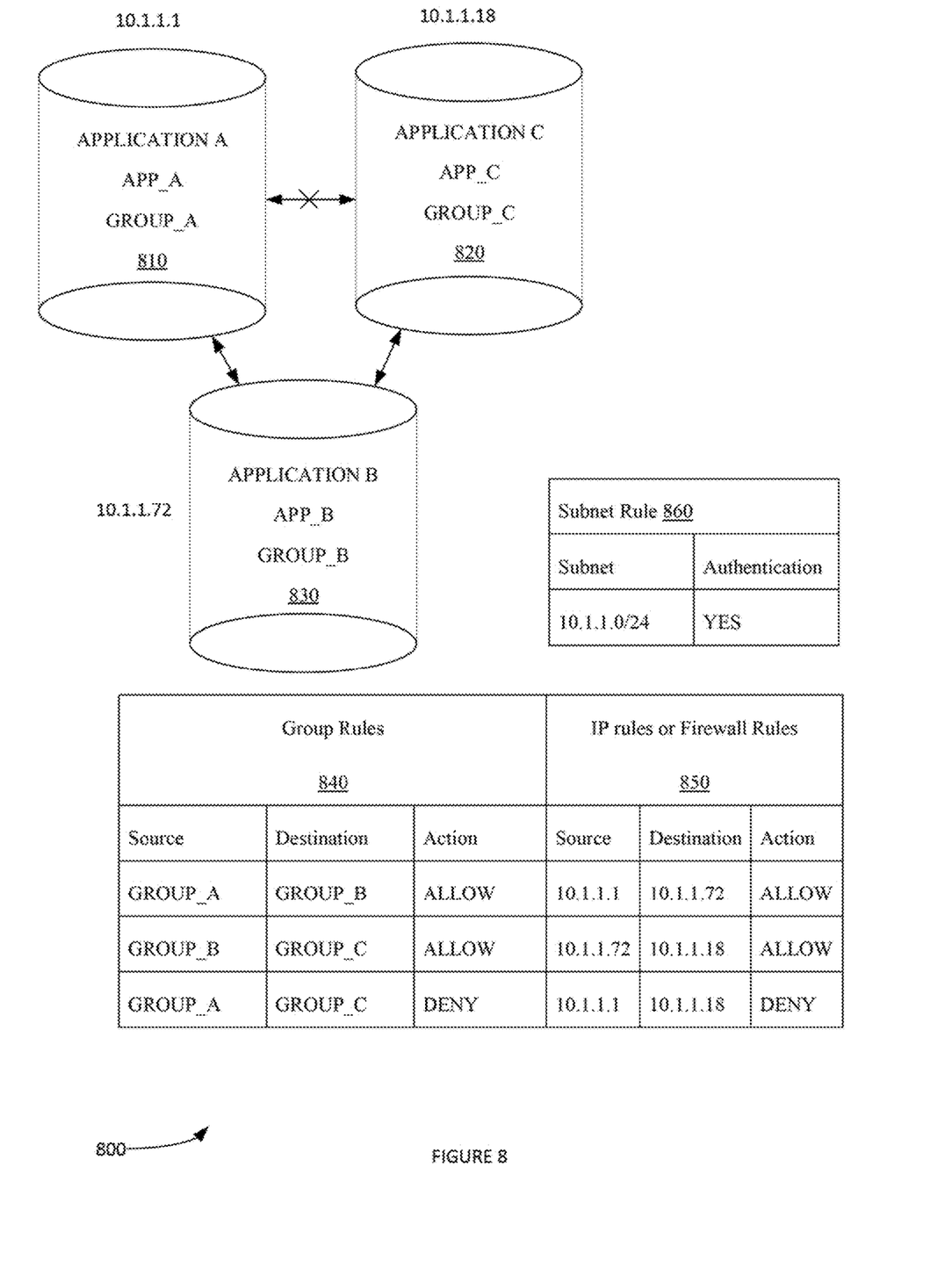
FIG. 8 is an illustration of how group policies and authentication rules are used to derive network firewall rules and enforce segmentation a network of application/containers.

FIG. 8 illustrates the enforcement of network firewall rules where group-based rules are translated to IP-based firewall rules and enforced. In the illustrated example, three applications APP_A 810, APP_B 820, and APP_C 830 belong to three different groups. The group security policies restrict any communication between the members of GROUP_A and GROUP_B while permitting communications between GROUP_A and GROUP_C, and GROUP_B and GROUP_C. The network security policies specifying these restrictions are specified as group rules 840. While the illustration shows the rule as a three (3)-tuple, a typical rule will be a five (5)-tuple or more. When a new network connection is initiated or received, the handler process checks the subnet authentication rule 860. If the rule states that authentication is required for communication on the subnet, authentication is initiated. If the authentication is not successful, the handler process retries authentication for a preset number of times before giving up. Upon successful authentication, the group of the remote entity is resolved. The group firewall rules 840 are converted to IP firewall rules 850 based on the observed address of the remote application.

The security considerations for the resolution of group identity are satisfied due to the knowledge that policy can be resolved at runtime based on strongly-authenticated evidence. The advantage of the current embodiment over prior art is that it does not require control over the orchestration mechanism assigning IP addresses to applications/containers. This decoupling of enforcement of security policy from control over the infrastructure makes it easy to layer security on top of an existing infrastructure. Our solution to de-multiplexing security associations is to use a handler service that performs authentication for each network connection. The group security policy is further modularized according to the server port address of the service. This allows the handler service to initiate separate authentication requests using the identity of the application/container that is requesting the network connection. A major improvement of this method over prior art is that it offers the capabilities of TLS without the need to manually install certificates, as well as more general security policies not tied to a specific network connection. Even in the cases where multiple applications share an IP address, the handler service enforces separate identities for applications based on their classification.

Thus, it is seen that systems and methods for cloud-based IMA for applications/containers and enforcement of group-based security policies are provided. The specification and drawings are not intended to limit the exclusionary scope of this patent document. It is noted that various equivalents for the particular embodiments discussed in this description may practice the invention as well. That is, while example embodiments have been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed:

1. A method for defining a group-based policy for access to computing resources by an application or a group of applications, comprising the steps of:
   with a credential server:
      specifying a computing resource;
      specifying a group name and a strong cryptographic identity associated with the group name;
      specifying a policy for the application belonging to a specific group to access a set of resources belonging to the group name;
   with a handler process:
      downloading a set of security group rule for the application from the credential server;
      reading a list of subnets for which authentication is to be enforced, wherein the authentication is enforced by the application;
      processing an initiate authentication request with an initiator of a new network connection or initiating a new authentication request with the initiator of the network connection,
      wherein the handler process uses an authentication token to obtain a strong cryptographic identity for the application; and
      wherein a strong cryptographic identity or a digital certificate is assigned to the application or group of applications and is used for authentication of the identity, in conjunction with a group-based security policy;
   upon successful authentication:
      extracting an identity of the initiator and a group of the initiator;
      obtaining a group security rule;
      translating the group security rule into an Internet Protocol (IP) firewall rule based on an observed IP address; and
      enforcing the IP firewall rule, and
      wherein a connection is permitted by determining that a source Internet Protocol (IP) address and a destination IP address belong to the groups that are allowed to communicate wherein the policy is for communication between a group of containers or applications to another group of containers or applications,
   wherein the handler process enforces a default firewall rule, and
   wherein the policy further includes communication between a physical machine or a virtual machine that represents an application or the group of applications.

2. The method of claim 1, wherein the security policies are managed in a public cloud-computing environment.

3. The method of claim 1, wherein the security policies are managed in a private cloud-computing environment.

4. A method for enforcing a group-based security policy for communication between an application or a group of applications, comprising the steps of:
   with a handler process:
      monitoring a set of new network connections;
      reading a list of subnets for which authentication is to be enforced, wherein the authentication is enforced by the application;
      reading a list of subnets for which authentication is to be ignored;
      initiating an authentication process with an initiator of the new network connection that is in the authentication-required subnet,
      wherein the handler process uses an authentication token to obtain a strong cryptographic identity for the application; and
   wherein a digital certificate is assigned to the application or group of applications and is used for authentication of the identity, in conjunction with a group-based security policy;
   upon successful authentication:
      extracting an identity of a remote application or a remote container and a group associated with the remote application or the remote container;
      obtaining a group security rule of the group; and
      translating the group security rule into an Internet Protocol (IP) firewall rule based on an observed IP address;
   upon unsuccessful authentication:
      performing a timeout operation and re-attempt the authentication process;
      determining that a specified number of authentication have occurred; and
      terminating the authentication retries, and
      wherein a connection is permitted by determining that a source Internet Protocol (IP) address and a destination IP address belong to the groups that are allowed to communicate wherein the policy is for communication between a group of containers or applications to another group of containers or applications,
   wherein the handler process enforces a default firewall rule, and
   wherein the policy further includes communication between a physical machine or a virtual machine that represents an application or the group of applications.

5. A method for authentication and encrypting communications between an application or a group of applications based on a strong cryptographic identity of the application or group of application and relevant subnet associations, comprising the steps of:
   with a handler process:
      monitoring new network connections;
      reading a list of subnets for which authentication is to be enforced, wherein the authentication is enforced by the application;

reading a list of subnets for which authentication is to be ignored;

initiating authentication with the initiator of the new network connection if it is in the authentication-required subnet, wherein the handler process uses an authentication token to obtain a strong cryptographic identity for the application; and wherein a digital certificate is assigned to the application or group of applications and is used for authentication of the identity, in conjunction with a group-based security policy;

upon successful authentication:

negotiating a session key for encrypting all communications;

encrypting all communications between the applications; and upon unsuccessful authentication:

performing a timeout operation and retrying the authentication process;

determining that a specified number of failures have occurred; and    terminating the authentication process retries wherein the handler process receives a list of subnets for which an authentication is to be ignored; and    wherein the handler process blocks all communication with the remote Internet Protocol (IP) address that did not successfully complete authentication.

\* \* \* \* \*